April 9, 1935.   E. E. HUFFMAN   1,997,062
BRAKING APPARATUS
Filed Aug. 28, 1931

Inventor
E. E. Huffman

UNITED STATES PATENT OFFICE 1,997,062

BRAKING APPARATUS

Edwin E. Huffman, St. Louis, Mo.

Application August 28, 1931, Serial No. 559,820

12 Claims. (Cl. 60—54.6)

My invention relates to braking apparatus and particularly to power actuating means for the compressor element of braking apparatus of the type in which fluid is employed to transmit braking pressure.

One of the objects of my invention is to so relate the power actuating means with the manual means for actuating the compressor that a part of said manual means, preferably the brake pedal, will constitute a control element for determining the braking pressure applied by the power source, whereby, in the event of failure of the power means, the operator may readily apply the brakes solely by pedal pressure in the usual manner without any preliminary movements or manipulations of mechanism.

Another object of my invention is to provide control means for the power actuator whereby the operator will "feel" the braking pressure in that the power applied reacts on the pedal in proportion to the magnitude of said power.

Figure 1:
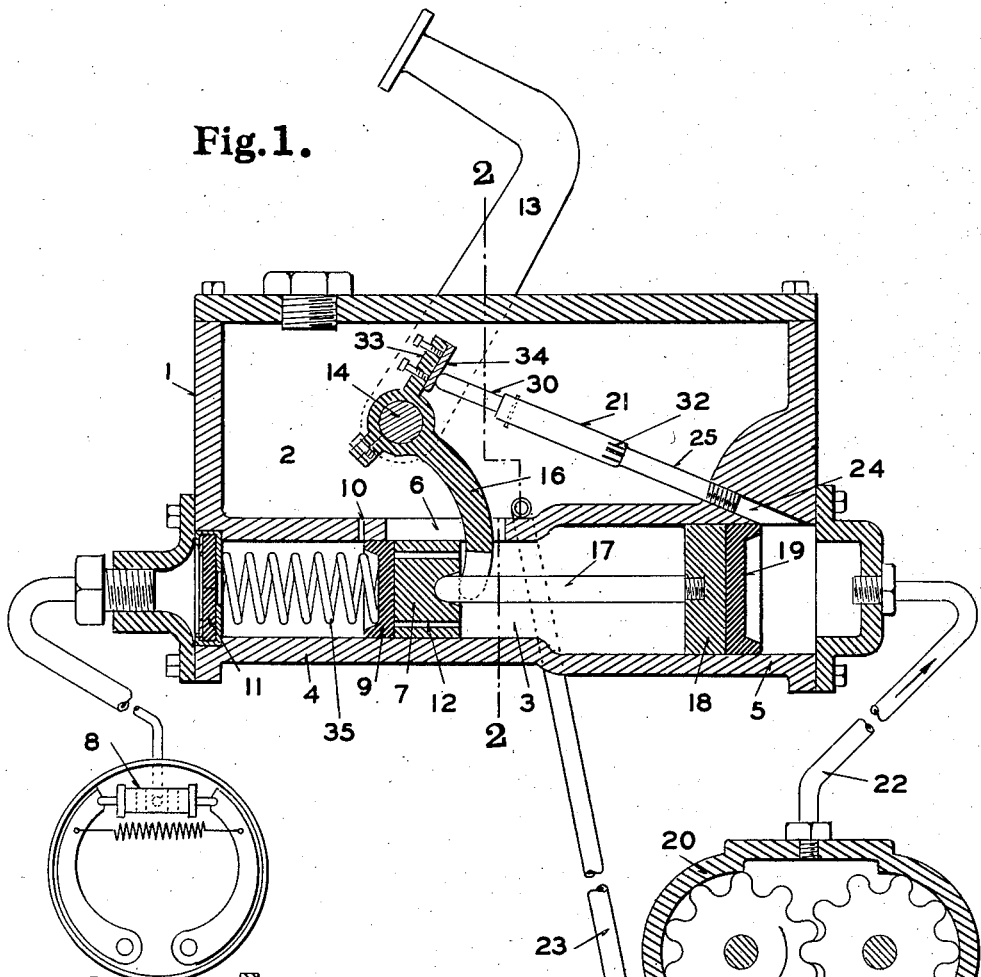
Figure 2:
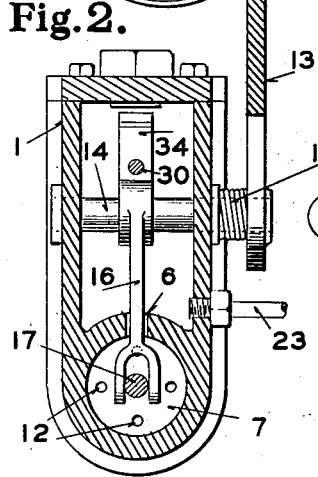
Figure 3:
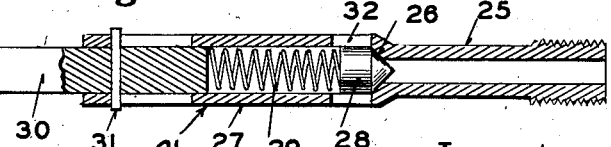

Further objects and advantages of the invention will appear from the following description:

In the accompanying drawing Figure 1 illustrates an embodiment of my invention, the fluid compressor and the source of power (pump) being shown in cross section and a wheel braking mechanism being shown diagrammatically; Figure 2 is a cross sectional view on the line 2—2 of Figure 1; and Figure 3 is an enlarged cross sectional view of the pedal operated valve, constituting the power controlling means.

Referring to the drawing, I indicates a casting mounted on the vehicle and so formed as to provide a reservoir 2 in the upper part thereof and two aligned cylinders 4 and 5 in the lower part. The space or chamber 3 between the cylinders is in continuous communication with the reservoir 2 through the elongated opening 6 through which the manually actuable operating arm 16 extends.

The cylinder 4 constitutes the compressor or "master cylinder" of the braking apparatus whereby fluid pressure is transmitted to the fluid of motors at the wheels, one of these motors being diagrammatically indicated at 8.

Since my invention does not relate to details of the hydraulic mechanism which directly actuates the brakes, it is unnecessary to give more than a brief description of particular mechanism for this purpose illustrated in the drawing. The liquid pressure is produced by piston 7 operating in the cylinder 4, this piston being shown in the drawing in its retracted position in which position the piston sealing cup 9 is at the rear of the compensating opening 10 through the wall of the cylinder and the latter, therefore, is in liquid communication with the reservoir 2. 11 indicates a differential valve at the forward end of the cylinder which permits liquid to be freely discharged into the brake line but requires a predetermined pressure to open it to allow the liquid to return to the master cylinder, thus maintaining such minimum pressure in the brake lines.

The piston 7 is also provided with passages 12 whereby liquid may pass from the rear of the piston and pass the sealing cup into chamber 4, should there be such a loss of liquid upon brake application that the piston could not otherwise return to off position without creating sub-atmospheric pressure in the brake line tending to draw air into the system at the wheel cylinders.

In addition to the parts just described, the mechanism illustrated embodies a known type of manual piston actuating means comprising foot pedal 13, mounted on shaft 14 journaled in the walls of reservoir 1. The pedal is provided with return spring 15 and is adapted to actuate the arm 16 also mounted on the shaft 14 and extending into operative rotation with the rear of piston 7. This arm is bifurcated at its lower end as shown in Figure 2 to permit the thrust member 17, carried by piston 18, to engage the center of piston 7. Piston 18 is provided with a sealing cup 19 and reciprocates in cylinder 5. This cylinder and piston constitute the fluid motor by means of which the power source actuates the compressor piston.

It will be noted that in the construction described the piston 7 may be actuated in pressure applying direction by means of foot pedal without thereby moving the piston 18.

In addition to the cylinder 5 and its piston 18, the power actuating mechanism of my invention comprises a fluid pump 20 for supplying fluid under pressure to the cylinder 5 and valve mechanism 21 for controlling the magnitude of this pressure. The pump may conveniently be of the well known gear type as illustrated and while it may be driven by seperate source of power such as electric motor, or by the vehicle engine, I prefer that it be driven from an element of the vehicle such as the propeller shaft or a portion of the transmission mechanism which is in operation when the vehicle is moving whether or not the vehicle power source is in operation. Thus the pump may deliver power for actuation of the brakes when the vehicle is "coasting" in the condition of being either entirely disconnected from the engine or being in what is commonly referred to as "free wheeling" connection therewith.

The delivery conduit 22 of the pump is connected with cylinder 5 and the supply conduit 23 is in communication with the liquid reservoir 2, preferably at a point above the level of the cylinder 4. The wall of cylinder 5 is provided with a passage 24 so located that the cylinder will always be in communication (through the valve mechanism 21) with the reservoir 2.

The valve mechanism illustrated comprises tube 25 forming an extension of passage 24 and provided with an internal valve seat 26 and with an extension 27 which carries the valve 28, the valve control spring 29, and the plunger 30 by means of which pressure may be applied to the valve through the spring. Fully retracted position of the plunger is determined by pin 31 carried by the plunger and projecting into the elongated slot in extension 27 as shown. When the valve is unseated during the operation of the pump, the liquid passes from the tube 25 to the reservoir 2, through the lateral openings 32 in the tube extension 27. The hub of the piston operating arm 16 is provided with upward extension 33 which carries adjustable abutment plate 34 to engage the valve controlling plunger 30.

Referring to the operation of the apparatus described, the brake system, pump and reservoir are supplied with a suitable brake operating fluid (a mixture of castor oil and alcohol, for example) and assuming that the vehicle is in motion, pump 20 circulates liquid from the reservoir to the cylinder 5 and through the valve 28 back to the reservoir. The valve 28 is preferably biased to fully closed position by means of spring 29, but this spring pressure is very light when the brake pedal is in retracted position and therefore the liquid pressure built up in the cylinder 5 by the pump in forcing liquid past the valve 28 is insufficient to overcome the tension of the usual piston returning spring 35 of the master cylinder and, therefore, the piston 7 will not be moved and no braking pressure will be built up in the braking system.

If the operator desires to apply the brakes, the pedal 13 is pressed downwardly and plunger 30 is thereby actuated to compress spring 29 whereby the pump immediately builds up a pressure in chamber 5 sufficient to overcome the resistance of the spring 29 and the piston 18 therefore applies pressure to piston 7 whether or not the arm 16 is simultaneously applying pressure thereto. The parts may be so arranged that during the initial part of the travel of the piston 7, there will be both a manual pressure on it through the arm 16 and a pump pressure through the piston 18, or, the parts may be so related that the arm 16 will never contact with the piston 7 during motion in brake applying direction except when more braking pressure is desired than the pump produces under the pressure on the valve 28 which will be produced by any movement of the foot pedal which does not bring arm 16 into engagement with the piston 7.

If it should be desired that all very light braking pressures be applied solely by the power of the operator and without the assistance of the pump pressure, the valve controlling parts will be so adjusted that certain minimum of travel of piston 7 must occur before spring 29 is compressed to a degree which will cause any operative pressure to be produced in the chamber 5. In all cases, however, it will be considered desirable that the minimum pressure of spring 29 (or the effective area of the passage from the cylinders to the reservoir in relation to pump capacity) be such that piston 18 will be caused to follow piston 7 whereby there will be no lost motion between the pistons to be taken up when the piston 18 becomes operative to assist braking action. It will usually be desired to so adjust the mechanism that after piston 18 becomes effective to apply pressure, it will supply all of the braking pressure required whereby the operator will not normally exert more effort than necessary to compress the valve spring to the proper degree to secure the desired braking action.

The pedal pressure required to cause the pump to produce pressure on piston 18 will be proportional to the produced pressure and, therefore, the operator will have the "feel" of the amount of braking pressure being applied and can as readily control this pressure as if he were himself directly applying all of the braking pressure.

As will be apparent, the structure described becomes automatically an ordinary manual braking system, in the event of any failure of the power mechanism, without the necessity of any movements or manipulations by the operator.

Upon release of the brake pedal by the operator, the spring 15 causes the arm 16 to immediately return to non-operative position and all pressure on valve 28 is released except the adjusted minimum pressure, if any, and since the valve opening may be readily made such as to permit liquid to discharge from the cylinder 5 as rapidly as it flows back to the master cylinder, the power apparatus does not interfere with quick release of the brakes.

The inlet and delivery openings of the pump being constantly beneath the normal liquid level in the reservoir, there is no possibility of air being drawn into the pump system so long as there is a proper supply of liquid in the reservoir, and by connecting of the inlet pipe 23 to the reservoir at a point above the level of the master cylinder 4, as shown, the vehicle operator will be warned to supply additional liquid to the reservoir before the liquid has been so far exhausted that the brakes are no longer even manually operable, in that the power system will have first ceased to function.

It will be understood that the diameter of the cylinder 5 may be larger or smaller than that of the master cylinder depending upon the maximum braking pressure desired and the maximum pressure which the form of pump employed is capable of producing at a selected speed; and, also, that only a very small gear pump would be required even for the largest vehicles.

The apparatus described permits substantially the full effort of the operator to be added to the maximum power of the pump in creating braking pressure for "emergency" stops.

Having fully described my invention, what I claim as new and desire to secure by Letters Patent of the United States is:

1. In fluid actuated braking apparatus, a compressor for creating fluid pressure to apply a brake, a fluid motor for actuating said compressor, a pump for creating pressure in said motor, a valve for controlling said pressure, and manual means capable of actuating the compressor and movable independently of the movable member of the fluid motor, said manual means controlling said valve independently of any movement of the movable member of the fluid motor to progressively vary the pressure which may be produced in the fluid motor in accordance with the extent of movement of said manual means.

2. In fluid actuated braking apparatus, a compressor for creating fluid pressure to apply a brake, power means for actuating the compressor, manual means for actuating the compressor, and capable of movement independently of the movable member of the power means, and control means operated by the manual means and adapted to cause the magnitude of the power applicable to the compressor by the power means to progressively increase in response to advance of the manual means in its operative path of travel.

3. In fluid actuated braking apparatus, a compressor for creating fluid pressure to apply a brake, power means for actuating the compressor, manual means capable of actuating the compressor and comprising a brake pedal, the actuated element of the compressor being free to advance in brake applying direction independently of the brake pedal, and control means operated by the brake pedal and adapted to cause the magnitude of the power applicable to the compressor by the power means to be lower at a position intermediate the limits of travel of the pedal than in a position in advance of said last named position, said control means being unaffected by movement of the actuated element of the compressor independently of movement of the brake pedal.

4. In fluid actuated braking apparatus, a compressor for creating pressure comprising a cylinder and piston therein, a fluid motor comprising a cylinder and a piston in alignment with the first named piston and having a member in thrust engagement therewith, manually operable means for actuating the first named piston, said manual means being movable independently of the piston of the fluid motor, means for supplying fluid under pressure to said fluid motor, a pressure relief valve for controlling the magnitude of said pressure, and means movable by the manual brake applying means for controlling the pressure required to open said valve, said means being unaffected by any movement of the movable member of the fluid motor independently of movement of the brake pedal.

5. In fluid actuated braking apparatus, a liquid reservoir, a compressor cylinder and piston therein, said cylinder being in communication with said reservoir when the piston is in retracted position, a fluid motor for actuating said piston and comprising a cylinder and a piston in alignment with the first named piston, a passage connecting said fluid motor with the reservoir, a fluid pump having its pressure side in communication with the fluid motor and with the reservoir through said passage, manual means for actuating the compressor piston, a valve for said passage, resilient means for biasing said valve toward closed position, and means for controlling the pressure of said resilient means in accordance with the position of said manual means.

6. In apparatus for creating fluid pressure for the actuation of fluid operated brakes, a member for applying pressure to the fluid, a fluid motor for applying pressure to said member, manual means for applying pressure to said member and comprising a brake pedal, said pedal being movable independently of the movable member of the fluid motor, a power operated pump connected to said fluid motor, a pressure relief valve for said motor, and means actuated by the brake pedal independently of any movement of the movable member of the fluid motor for controlling the pressure required to open said valve.

7. In fluid actuated braking apparatus, a liquid reservoir, a compressor cylinder beneath the reservoir and a piston in said cylinder, a liquid motor comprising a cylinder and a piston in alignment with the compressor piston, means for transmitting the motion of the liquid motor piston to the compressor piston in pressure applying direction only, a liquid chamber between said pistons and in communication with the reservoir, a manually actuable member extending into said chamber and to a position at the rear of the compressor piston to be engageable therewith, a brake pedal for operating said member, means forming a passage connecting the liquid motor cylinder with the reservoir, a relief valve in said passage, a power actuated liquid pump having its delivery side connected to the motor cylinder and its inlet connected to the liquid reservoir, resilient means tending to close the valve, and means governed by the position of the brake pedal for varying the resistance of the resilient means to the opening movement of the valve.

8. In fluid actuated braking apparatus, a compressor for creating fluid pressure to apply a brake, power means for actuating the compressor, manual means capable of actuating the compressor and comprising a brake pedal, the actuated element of the compressor being movable in brake applying direction independently of the manual means, and means for progressively varying the magnitude of the pressure applied by the power means in accordance with the extent of movement of the brake pedal, from its off position.

9. In apparatus for creating liquid pressure for the actuation of liquid operated brakes, a member for applying pressure to the liquid, a liquid motor for applying pressure to said member, manually operable means for applying pressure to said member, said manual means being movable independently of the movable member of the motor, a power operated pump connected to circulate liquid through said liquid motor, a pressure adjusting valve in the discharge passage from said motor capable of varying the liquid pressure applicable by said pump to said motor, and manually operable means for controlling said valve independently of any movement of the movable member of the liquid motor.

10. In apparatus for creating liquid pressure for the actuation of liquid operated vehicle brakes, a member for applying pressure to the liquid, a liquid motor for applying pressure to said member, manually operable means for applying pressure to said member, said manual means being movable independently of the movable member of the motor, a pump and connections operable to continuously circulate liquid through said liquid motor while the vehicle is in motion, a pressure adjusting valve in the discharge passage from said motor capable of varying the liquid pressure applicable by said pump to said motor, and manually operable means for controlling said valve independently of any movement of the movable member of the liquid motor.

11. In apparatus for creating fluid pressure for the actuation of fluid operated brakes, a member for applying pressure to the fluid, a fluid motor for applying pressure to said member, manual means for applying pressure to said member and comprising a brake pedal, a power operated pump connected to said fluid motor, a pressure relief valve for said motor, and adjustable connections between the valve and brake pedal for varying the pressure required to open the valve in response to the movement of the pedal.

12. Power means for actuating vehicle brakes comprising a liquid motor, a pump and connections for continuously circulating liquid through said motor while the vehicle is in motion, a pressure adjusting valve in the discharge passage from said motor for varying the liquid pressure applicable by said pump to said motor, said valve being biased to closed position but being so mounted that the pressure of the liquid in the discharge passage tends to maintain the valve in open position, and manual means for actuating the brakes and for applying pressure to the valve to urge it toward closed position, said manual means being movable to actuate the brakes without moving the movable member of the liquid motor when said motor and pump are inoperative.

EDWIN E. HUFFMAN.